No. 869,623. PATENTED OCT. 29, 1907.
F. L. CLARK.
TRIPLE VALVE CONNECTION.
APPLICATION FILED FEB. 27, 1905.
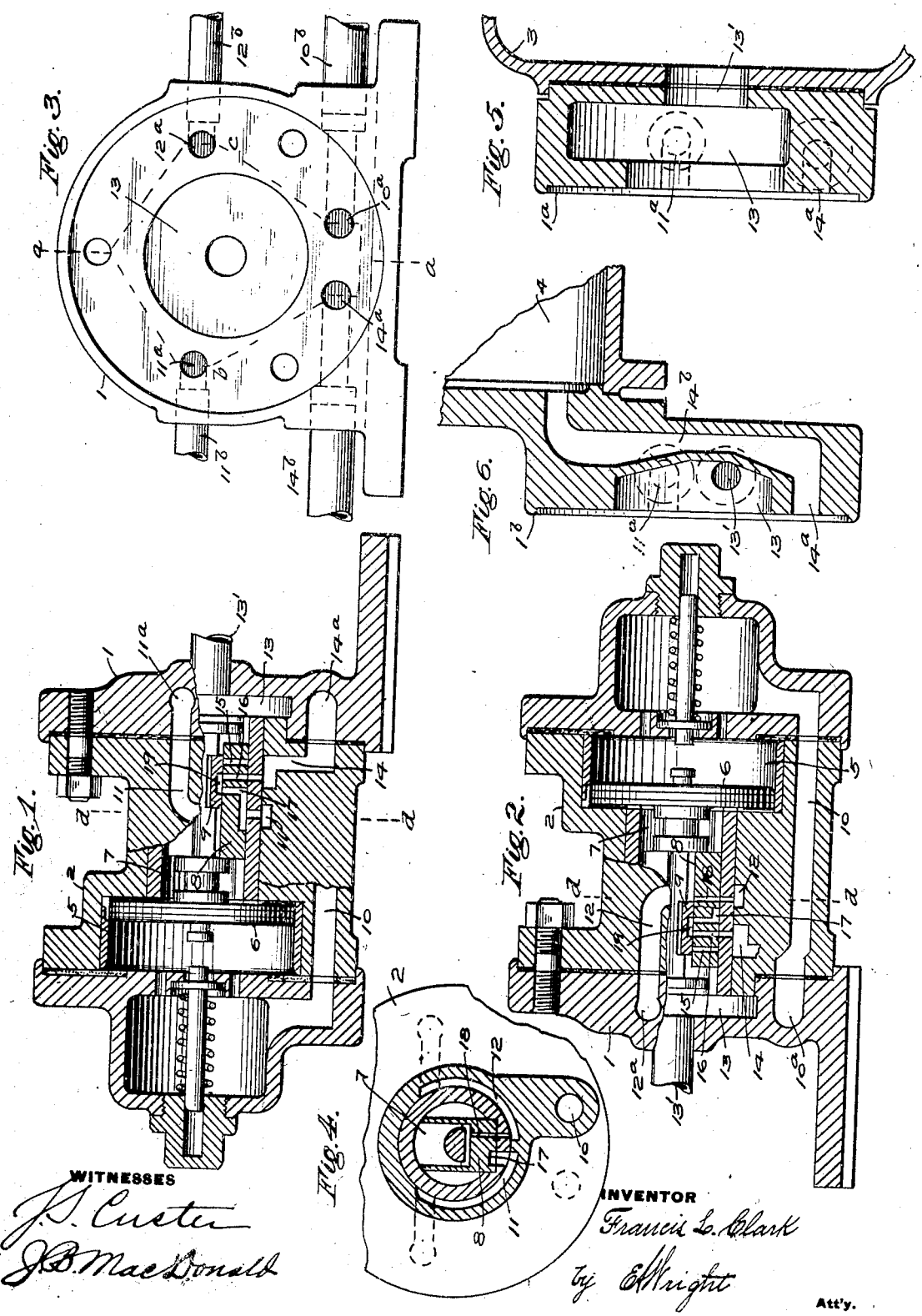
WITNESSES
INVENTOR
Francis L. Clark
by E. Wright
Att'y.

UNITED STATES PATENT OFFICE.

FRANCIS L. CLARK, OF PITTSBURG, PENNSYLVANIA, ASSIGNOR TO THE WESTINGHOUSE AIR BRAKE COMPANY, OF PITTSBURG, PENNSYLVANIA, A CORPORATION OF PENNSYLVANIA.

TRIPLE-VALVE CONNECTION.

No. 869,623.  Specification of Letters Patent.  Patented Oct. 29, 1907.

Application filed February 27, 1905. Serial No. 247,448.

*To all whom it may concern:*

Be it known that I, FRANCIS L. CLARK, a citizen of the United States, residing in Pittsburg, in the county of Allegheny and State of Pennsylvania, have invented a certain new and useful Improvement in Triple-Valve Connections, of which the following is a specification.

This invention relates to automatic air brake apparatus, and more particularly to the triple valve device and means for connecting the same to the various pipes and reservoirs of the system.

According to the present standard construction the triple valve device comprises a casing or body adapted to be bolted up to some rigidly supported part, such as the auxiliary reservoir or the brake cylinder or an independent bracket, the valve body being provided with pipe connections for the train pipe, the retaining valve, and the supplemental reservoir or additional source of pressure in case such is used. This construction necessitates the unscrewing and breaking of these pipe connections from the triple valve body each and every time that the triple valve is taken down for cleaning, repairing or replacing with another valve, thereby causing great inconvenience, much unnecessary work and loss of time. This frequent taking down of the triple valve also tends to injure the pipe joint connections and render the same liable to leakage.

The principal object of my invention is to overcome these objections and to provide a block or casing having ports and passages for the various pipe connections and adapted to be rigidly and permanently supported in any of the ways hereinbefore mentioned or any other convenient manner, together with a triple valve body having corresponding ports and passages and adapted to be bolted or otherwise secured against the face of the block or casing, thereby dispensing with all pipe connections to the triple valve body. By this means the triple valve may be taken down for cleaning or repairs at any time by merely loosening a few bolts and without unscrewing any joints or breaking any pipe connections.

In the accompanying drawing, Figure 1 shows in section a triple valve device secured to one form of block or casing embodying my improvement and adapted to be supported on an independent bracket, the section of the fixed casing and a portion of the triple valve body being taken substantially on the line $a$—$b$—$a$ of Fig. 3; Fig. 2 a similar section taken substantially on the line $a$—$c$—$a$ of Fig. 3; Fig. 3 a face view of one form of my improved fixed block or casing; Fig. 4 a transverse section of the triple valve device taken on the line $d$—$d$ of Figs. 1 and 2; Fig. 5 a sectional view of a slightly modified form of fixed block or casing showing the same secured to the auxiliary reservoir; and Fig. 6 a section showing another modification adapted to be secured to the brake cylinder.

This invention is illustrated in connection with a triple valve device of the type in which air under pressure from a supplemental reservoir, main reservoir, or other source of pressure is used for graduating the release of the brake and for restoring pressure in the auxiliary reservoir, thereby requiring five different connections to the triple valve, viz., the train pipe, the auxiliary reservoir, the brake cylinder, the supplemental reservoir or additional supply of fluid pressure, and the retaining valve pipe for the exhaust.

As shown in the drawing, the triple valve device comprises a body portion 2 having a piston chamber 5 containing a piston 6, and a valve chamber 7 containing a main slide valve 8 and a graduating slide valve 9. The triple valve body is provided with passages 10, 11, 12 and 14, leading from corresponding port openings in the face of the triple valve body to the piston chamber 5, the exhaust port, the supplemental reservoir port, and the brake cylinder port respectively in the slide valve seat. The main slide valve 8 is provided with service port 15, supplemental reservoir port 18 and exhaust ports 16 and 17, while the graduating slide valve 9 has a cavity 19 for controlling the exhaust ports in the main valve.

Although I have shown a particular arrangement of the ports in the valve seat and slide valves, it is to be understood that my improvement is not limited to this construction, nor that this particular arrangement comprises a feature of my present invention, since the same has previously been described in other patents, and as the operation thereof in applying, releasing and controlling the braking pressure is well understood by those familiar with the art, it will be unnecessary to further describe the action of the valve device in the performance of its usual functions in response to the customary variations in train pipe pressure.

According to my present invention a fixed block or casing 1, adapted to be supported in any convenient manner either on a separate bracket, reservoir, or brake cylinder, is provided with a face having ports or passages $10^a$, $11^a$, $12^a$, and $14^a$, adapted to register with the corresponding ports 10, 11, 12 and 14 in the face of the triple valve body when the same is bolted onto the fixed casing in its usual position. As shown in Fig. 3, pipe connections $10^b$ from the train pipe, $11^b$ from the retaining valve, $12^b$ from the supplemental reservoir, and $14^b$ from the brake cylinder are screwed into the fixed casing 1 and communicate respectively with the ports $10^a$, $11^a$, $12^a$, and $14^a$, and with the corresponding passages in the triple valve body, while the slide valve chamber communicates with the chamber 13 of the casing and with the auxiliary reservoir through pipe or passage $13'$.

According to the modification shown in Fig. 5, the casing 1ª is adapted to be secured to the end of the auxiliary reservoir 3 and supported thereby. In this case the passage 13′ leads directly into the auxiliary reservoir while the other ports are arranged as shown in Fig. 3. The modified form of casing 1ᵇ, shown in Fig. 5, is designed to be secured to the brake cylinder 4, and preferably comprises the head thereof. In this case the passage 14ᵇ leads through the casing into the brake cylinder, and the chamber 13 communicates by pipe connections 13′ on one or both sides with the auxiliary reservoir, the other ports and pipe connections being arranged as before described.

By means of my improvement the pipe connections to the fixed casing may remain permanently attached while the triple valve body may be readily taken down at any time for inspection, cleaning, or repairs, by merely loosening the usual clamping bolts and without disturbing the pipe connections.

Having now described my invention, what I claim as new and desire to secure by Letters Patent is:—

1. In an air brake, the combination with a fixed casing having ports and passages connected respectively with the train pipe, auxiliary reservoir, brake cylinder, and supplemental reservoir, of a triple valve body having corresponding ports and passages adapted to register with those of the fixed casing, and means for securing the triple valve body to the fixed casing.

2. In an air brake, the combination with a fixed casing having ports and passages connected respectively with the train pipe, auxiliary reservoir, brake cylinder, and retaining valve pipe, of a triple valve body having corresponding train pipe, auxiliary reservoir, brake cylinder, and exhaust ports adapted to register with those of the fixed casing, and means for securing the triple valve body to the fixed casing.

3. In an air brake, the combination with a separate bracket forming a fixed casing having ports and passages connected respectively with the train pipe, auxiliary reservoir, and brake cylinder, of a triple valve body having corresponding ports and passages adapted to register with those of said bracket.

4. In an air brake, the combination with a separate bracket forming a fixed casing having ports and passages connected respectively with the train pipe, auxiliary reservoir, brake cylinder, and a supplemental source of fluid pressure, of a triple valve body having corresponding ports and passages adapted to register with those of said bracket, and means for securing the body to the bracket.

In testimony whereof I have hereunto set my hand.

FRANCIS L. CLARK.

Witnesses:
J. S. CUSTER,
R. F. EMERY.